(12) United States Patent
Bennett, III et al.

(10) Patent No.: US 6,477,444 B1
(45) Date of Patent: Nov. 5, 2002

(54) METHOD FOR THE AUTOMATED DESIGN OF DECENTRALIZED CONTROLLERS FOR MODULAR SELF-RECONFIGURABLE ROBOTS

(75) Inventors: Forrest H. Bennett, III, Palo Alto; Eleanor Rieffel, Mountain View, both of CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/611,395

(22) Filed: Jul. 7, 2000

(51) Int. Cl.$^7$ ............................................. G06F 19/00
(52) U.S. Cl. ........................ 700/245; 700/1; 700/95; 700/100; 700/254; 708/404; 708/406; 702/182; 703/1; 703/2; 703/7
(58) Field of Search ................. 700/245, 246, 700/254, 250, 90, 253, 257, 5, 8, 9, 23, 28, 91, 95, 100, 1; 702/182; 703/1, 2, 7; 708/404, 406, 816; 710/132; 358/408, 426, 470

(56) References Cited

U.S. PATENT DOCUMENTS

| | | | | |
|---|---|---|---|---|
| 4,648,997 A | * | 3/1987 | Romeo et al. | 358/408 |
| 4,811,210 A | * | 3/1989 | McAulay | 710/132 |
| 4,935,877 A | | 6/1990 | Koza | 364/513 |
| 5,222,192 A | | 6/1993 | Shaefer | 395/13 |
| 5,586,218 A | | 12/1996 | Allen | 395/10 |
| 5,832,467 A | | 11/1998 | Wavish | 706/13 |
| 5,867,397 A | | 2/1999 | Koza et al. | 364/489 |
| 5,870,527 A | | 2/1999 | Fujikawa et al. | 395/80 |
| 5,870,698 A | * | 2/1999 | Riedel et al. | 702/182 |
| 5,884,206 A | | 3/1999 | Kim | 701/50 |
| 5,894,450 A | | 4/1999 | Schmidt et al. | 367/134 |
| 5,928,297 A | | 7/1999 | Murata et al. | 701/37 |
| 5,942,869 A | | 8/1999 | Katou et al. | 318/568.12 |
| 6,003,056 A | * | 12/1999 | Auslander et al. | 708/404 |
| 6,004,016 A | | 12/1999 | Spector | 364/167.02 |
| 6,004,019 A | | 12/1999 | Suita et al. | 364/477.06 |
| 6,011,372 A | | 1/2000 | Popovich, Jr. et al. | 318/560 |
| 6,032,139 A | | 2/2000 | Yamaguchi et al. | 706/13 |
| 6,233,503 B1 | * | 5/2001 | Yim et al. | 700/245 |
| 6,243,622 B1 | * | 6/2001 | Yim et al. | 700/245 |
| 6,256,598 B1 | * | 7/2001 | Park et al. | 703/2 |

OTHER PUBLICATIONS

Juneja et al., Kinmatic calibration of a re–configurable robot (roboTwing)expo1, 1997, IEEE, pp. 3178–3138.*

Fryer et al., Configuring robots from modules: and object oriented approach, 1997, IEEE, pp. 907–912.*

Bojinov, Hristo, et al., *Emergent Structures in Modular Self–reconfigurable Robots*, IEEE Intl. Conf. On Robotics and Automation (ICRA) Apr. 2000.

Bonabeau, Eric, et al., *Swarm Intelligence: from Natural to Artificial Systems*, Oxford Univ. Press, 1999.

Casal, Arancha, et al., *Self–Reconfiguration Planning for a Class of Modular Robots*, Proceedings of SPIE'99, vol. 3839, Sep., 1999.

Chen, I. Ming, *Theory and Applications of Modular Reconfigurable Robotic Systems*, Division of Engineering and applied Science, California institute of Technology, 1994.

Chen, I. Ming, et al., *Determining Task Optimal Modular Robot Assembly Configurations*, IEEE Intl. Conference on Robotics and Automation, Nagoya, Japan, 1995, pp. 132–137.

(List continued on next page.)

Primary Examiner—William A. Cuchlinski, Jr.
Assistant Examiner—McDieunel Marc
(74) Attorney, Agent, or Firm—Fliesler Dubb Meyer & Lovejoy LLP

(57) ABSTRACT

A method and computer-readable medium is provided for designing control software for a module in a self-reconfigurable robot. A genetic method randomly selects a plurality of module software functions for creating a plurality of module control software programs. The plurality of control software programs are then evaluated against a series of tasks and respective fitness functions. The module control software is selected based on the software program having the highest fitness function value for a particular task.

48 Claims, 6 Drawing Sheets

STEP 1

STEP 2

OTHER PUBLICATIONS

Chen, I. Ming, *On Optimal Configuration of Modular Reconfigurable Robots*, 4$^{th}$ Intl. Conference on Control, Automation, Robotics and Vision, Singapore 1996.

Hayes, Thomas et al., *Strongly Typed Genetic Programming In Evolving Cooperation Strategies*, Proceedings of the Sixth International Conference on Genetic Algorithms, San Francisco, California; Morgan Kaufmann pp. 271–278, 1995.

Kotay, Keith, et al., *The Self–reconfiguring Robotic Molecule*, Proceedings of the 1998 IEEE Intl. Conference on Robotics and Automation, Leuven, Belgium, May 1998.

Koza, John R., *Genetic Programming: On the Programming of Computers by Means of Natural Selection*, Cambridge, MA: MIT Press 1992.

Koza, John R., et al., *Genetic Programming III: Darwinian Invention and Task Solving*, Morgan Kaufman, San Francisco, California, 1999.

Pamecha, Amit, et al., *Design and Implementation of Metamorphic Robots*, Proceedings of the 1996 ASME Design Engineering Technical Conference and Computers and Engineering Conference, 1–10, New York, NY, ASME Press, Aug., 1996.

Pamecha, Amit, et al., *Useful Metrics for Modular Robot Motion Planning,*, IEEE Transactions on Robots and Automation, pp. 531–545, vol. 13, No. 4, Aug. 1997.

PARC *http://www.parc.xerox.com/comdex99/mod–robotics*.

Rus, Daniela, et al., *Self–reconfiguration Planning with Compressible Unit Modules*, Proceedings of the 1999 IEEE Intl. Conference on Robotics and Automation, Detroit, Michigan –May, 1999.

Tummala, R. Lal, et al., *Reconfigurable Adaptable Micro–robot*, Proceedings of IEEE International Conference of Systems, Man, and Cybernetics, Tokyo, Japan, Oct. 1999.

Ünsal, Cem, et al., *A Modular Self–Reconfigurable Bipartite Robotic System: Implementation and Motion Planning*, submitted to Autonomous Robots Journal, special issue on Modular Reconfigurable Robots, 2000.

Ünsal, Cem, et al., *Motion Planning for a Modular Self–Reconfiguring Robotic System*, submitted to 5$^{th}$ Intl. Symposium on Distributed Autonomous Robots Systems (DARS 2000), Oct. 4–6, 2000, Knoxville, Tennessee, USA.

The USC/ISI CONRO Project, *http://www.isi.edu.conro*.

Will, Peter, et al., *Robot Modularity for Self–Reconfiguration*, Part of the SPIE Conference on Sensor Fusion and Decentralized Control II, pp. 236–245, Boston, Massachusetts, Sep., 1999.

Wright, Sewall, *Isolation by Distance*, Genetics 28:114–138, Mar., 1943.

Yamazaki, Koetsu, et al., *Genetic Programming Based Learning of Control Rules for Variable Geometry Structures*, Proceedings of the 3$^{rd}$ Annual Genetic Programming Conference, Jul. 1998, Morgan Kaufmann Publishing, 1998, pp. 412–415.

Yim, Mark, et al., *PolyBot: a Modular Reconfigurable Robot*, IEEE International Conference on Robotics and Automation (ICRA), San Francisco, California, Apr., 2000.

Yim, Mark, et al., *Rhombic Dodecahedron Shape for Self--Assembling Robots*, Xerox PARC SPL TechReport P9710777, 1997.

CEC00, Congress on evolutionary computation program, 2000, Internet, pp. 1–16.*

* cited by examiner

STEP 1          STEP 2

METHOD FOR THE AUTOMATED DESIGN OF DECENTRALIZED CONTROLLERS FOR MODULAR SELF-RECONFIGURABLE ROBOTS

FIELD OF THE INVENTION

The present invention is related to modular robots, and in particular, software for modular robots.

BACKGROUND

Modular hardware that can reconfigure itself is usually referred to as a self-reconfigurable modular robot. A self-reconfigurable modular robot is composed of many identical modules and does not resemble the common view of a robot. Each module typically has a power source, processor, memory, motor, sensors, singly or in combination. The modules can attach to and detach from each other. Individual modules on their own can do little, but the robot, using the capabilities of the individual modules, can reconfigure itself to solve problems.

Advantages of self-reconfigurable modular robots include physical adaptability to varying problems and environments, robustness since identical modules can replace each other in the event of failure, and economies of scale in the manufacturing process.

Examples of self-reconfiguring modular robots include:

1) CMU's I-cubes as described in C. Ünsal, H. Kiliççöte, P. K. Khosla, "A 3-D Modular Self-Reconfigurable Bipartite Robotic System: Implementation and Motion Planning," submitted to Autonomous Robots Journal, special issue on Modular Reconfigurable Robots, 2000;
2) USC-ISI's Spider Link Models, P. Will, A. Castano and W-M. Shen, "Robot Modularity for Self-Reconfiguration," Proc. SPIE Sensor Fusion and Decentralized Control II, pp. 236–245, Boston, September 1999.
3) Dartmouth's Molecular Robots, Kotay, K., Rus, D., Vona, M. and McGray, C., "The Self-reconfiguring robotic molecule: design and control algorithms". In Proceeding of the 1998 International Conference on Intelligent Robots and Systems, 1998;
4) Crystalline Robots, Rus, D., M. Vona, "Self-Reconfiguration Planning with Compressible Unit Modules". In 1999 IEEE Int. Conference on Robotics and Automation;
5) MSU's Reconfigurable Adaptable Micro-Robot, R. L. Tummala, R. Mukherjee, D. Aslam, N. Xi, S. Mahadevan, J. Weng, "Reconfigurable Adaptable Micro-Robot", Proc. 1999 IEEE International Conference on Systems, Man, and Cybernetics, Tokyo, Japan, October 1999;
6) Johns Hopkins University, s Metamorphic Robots, Amit Pamecha, Imme Ebert-Uphoff, Gregory S. Chirikjian, A Useful Metrics for Modular Robot Motion Planning, IEEE Transactions on Robots and Automation, pp. 531–545, Vol.13, No.4, August 1997 ("Pamecha");
7) Xerox PARC's PolyBot, Yim, Mark, Duff, David G., Roufas, Kimon D. IEEE Intl. Conf. On Robotics and Automation (ICRA), 2000; and,
8) Proteo robots Hristo Bojinov, Arancha Casal, Tad Hogg, "Emergent Structures in Modular Self-reconfigurable Robots", IEEE Intl. Conf. on Robotics and Automation (ICRA) 2000.

It is difficult to design effective software for self-reconfiguring modular robots. It is desirable to have the software completely decentralized and completely autonomous, so that tasks can be performed without reference to a central controller, whether human or machine. The hope is that eventually hundreds, or even millions, of modules will work together. Decentralized control takes advantage of the computational power of the individual modules and requires less communication bandwidth. All modules typically run the same software program, but behave differently depending on individual sensor values, internal state, and messages received from nearby modules.

Thus, there is a desire to provide decentralized software controllers for self-reconfigurable modular robots that act at a local level but achieve useful global behavior.

SUMMARY OF INVENTION

A method and computer-readable medium is provided for designing a software program for a module in a self-reconfigurable robot.

The method includes the step of providing a plurality of software functions for performing a respective plurality of module functions. A first plurality of software programs for solving a task is constructed from the plurality of software functions. The first plurality of software programs are executed to obtain a plurality of results. The method includes the step of providing a fitness function for obtaining a fitness function value for the first plurality of software programs. A second plurality of software programs is selected from the first plurality of software programs based on the respective fitness function values. The second plurality of software programs is modified, by a genetic operation, to form a third plurality of software programs.

According to an aspect of the present invention, the genetic operation is a crossover, mutation and/or cloning operation, singly or in combination.

According to an aspect of the present invention, the crossover operation includes obtaining respective parse tree representations of a first and second "parent" computer program in the second plurality of software programs to create a first and second "child" software program by exchanging a randomly selected subtree between the first and second "parent" computer program.

According to another aspect of the present invention, the mutation operation includes obtaining a parse tree representation of a first software program in the second plurality of computer programs The parse tree includes a first subtree. The first subtree is randomly selected and replaced with a randomly created second subtree.

According to another aspect of the present invention, the cloning operation includes copying a first software program in the second plurality of software programs.

According to another aspect of the present invention, the plurality of functions include: (GetMemory index), (MoveLine direction), (MoveSingle direction), (ReadMessage direction), (ReadSensorSelf direction), (ReadSensorSelfBroken direction), (ReadSensorWall direction), (Rotate direction), (SendMessage message direction) (SetMemory Index value), (BlockMove xpos xneg ypos yneg), (And), (If), (Less), (Divide), (Modules) functions, either singly or in combination.

According to another aspect of the present invention, the module is a sliding module, a rotating module and/or a compressible module.

According to another aspect of the present invention, the task is moving a self-reconfigurable robot through a narrow passage.

According to another aspect of the present invention, the task is moving the self-reconfigurable robot through a switchback passage.

According to another aspect of the present invention, the task is moving the self-reconfigurable robot having a broken module through a switchback passage.

According to another aspect of the present invention, the task is moving the self-reconfigurable robot through a switchback passage and ejecting a broken module.

According to another aspect of the present invention, the task is forming a bridge over a gap.

According to another aspect of the present invention, the task is moving the self-reconfigurable robot toward a goal.

According to another aspect of the present invention, the task is moving the self-reconfigurable robot toward a goal in the presence of obstacles.

According to another aspect of the present invention, a module includes a sensor, a motor and a power source, singly or in combination.

According to another aspect of the present invention, the fitness function includes measuring the distance between a robot location and a selected location.

According to another aspect of the present invention, a module in a self-reconfigurable robot with software created by genetic programming is provided. The module includes a processor coupled to memory. The memory stores a software program for solving a problem, wherein the software program is constructed from a genetic program.

An article of manufacture, including computer readable memory is provided. The computer readable memory includes a first plurality of software functions for performing a respective plurality of module tasks in a self-reconfigurable robot. A first software program randomly selects a first plurality of functions to form a plurality of software programs. A fitness function obtains a respective plurality of fitness function values for the respective first plurality of software programs. A second software program selects a second plurality of programs from the first plurality of programs based on the respective plurality of fitness function values. A third software program constructs a third plurality of software programs from the second plurality of software programs by a genetic operation.

DETAILED DESCRIPTION

I. Overview

A. Genetic Programming

Figure 1:
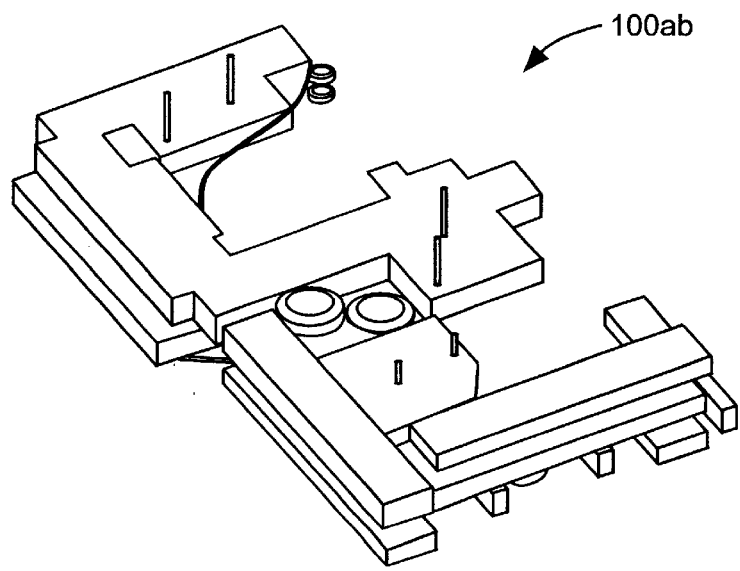
FIG. 1 illustrates two modules in a self-reconfigurable robot, according to an embodiment of the present invention.

Genetic programming is an evolutionary method that is able to generate a computer program that solves a problem when given a high level description of the problem to be solved. A description of genetic programming is found in John R. Koza, *Genetic Programming: On the Programming of Computers by Means of a Natural Selection*. Cambridge, Mass.: MIT Press ("Koza 1992"). In order to use genetic programming to create a computer program, it is necessary to provide the method with an objective function (or fitness function) for the problem to be solved, a set of primitive functions (number, boolean, character . . . ) to build the programs with, the return type for each primitive function, the number of arguments for each primitive function, and the type of each argument to each primitive function, and a few parameters.

The genetic programming method begins by generating a population of grammatically correct random programs in the target language. The fitness of each program in the population is determined by executing each program and measuring how that program scores on the fitness function.

Then the existing population of computer programs is used to create a new population of computer programs using genetic operations. The genetic operators are applied in proportion to the fitness of the computer programs so that more fit programs are used more often to create new computer programs. That is, more fit programs are selected more often to be "parents" for the creation of new computer programs in the next generation.

The genetic operations used are crossover, mutation, and cloning.

A crossover operation takes parse tree representations of two fitness-selected "parent" computer programs and creates two new "child" programs by exchanging a randomly selected subtree between the two parents.

The mutation operation takes a parse tree representation of one fitness-selected computer program, randomly selects one of its subtrees, and replaces that subtree with a new randomly created subtree.

The cloning operation takes one fitness selected computer program and creates a copy of it for a new population.

After an entirely new population has been created by applying genetic operations to the previous population, the fitness of each program in the new population is measured using the fitness function as before. The process of creating new populations of programs and measuring their fitness is repeated until a computer program is discovered that gets an optimal score on the fitness function or the process is terminated. The computer program with the best score so far on the fitness function is the result of this process.

In an embodiment of the present invention, computing the fitness function involves running an evolved computer program to control a simulation of a modular robot in a simulated world. The computed value of the fitness function is a measure of how well the modular robot performed the goal. For example, the fitness function might measure the distance between the modular robot and the goal location in a simulated world.

In an alternate embodiment, a Genetic Algorithm and Evolutionary Programming, singly or in combination, may be used.

II. Robot Modules

Figure 2:
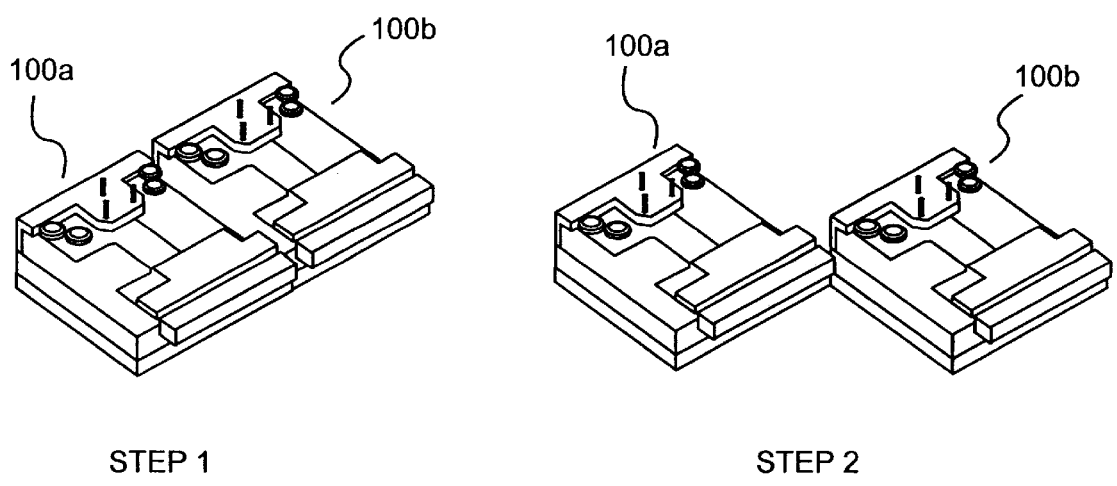
FIG. 2 illustrates a MoveSingle operation for a self-reconfigurable robot module, according to an embodiment of the present invention.

In an embodiment, a self-configurable robot 100ab is used as described in Pamecha, and illustrated in FIG. 1. The square modules move in a two-dimensional plane by sliding against each other, as illustrated in FIG. 2. Before a Movesingle function, the two modules 100ab have a connected edge (step 1), and then after a MoveSingle function, the two modules 100ab are still connected at a shared corner (step 2). A module cannot move at all unless it is connected to another module that it can push or pull against. Each module occupies one grid unit in a simulated world, and all moves are in whole grid units. In an embodiment of the present invention, sensing, communication and processing capabilities were added to the self-configurable modules used in Pamecha.

Each square robot module occupies one grid location in a world. The state of a robot module includes: 1) its location in the world, 2) the values of the most recent messages received from adjacent robot modules in each of eight directions, 3) the values of its memory locations, 4) whether or not the module is broken, and 5) the facing direction.

A. Directions

Directions are encoded as real values between 0.0 and 1.0, where direction 0.0 is the robot module's positive x axis, and direction values increase going around counter clockwise. The direction values used by each robot module are local to that module's own frame of reference. The direction that a robot module is facing is always direction 0.0 in the robot module's frame of reference. Direction 0.25 is 90 degrees to the left of where it is facing in the world, etc.

B. Sensors

Each module has eight sensors for detecting other robot modules, and eight sensors for detecting walls and obstacles. The eight directions for sensors are: 0.0=east, 0.125=northeast, 0.25=north, 0.375=northwest, 0.5=west, 0.625=southwest, 0.75=south, and 0.875=southeast. The module's sensor readings are in units of intensity between 0.0 and 1.0, where the intensity is the inverse of the distance to the thing sensed; 0.0 means that the thing was not sensed at all, and 1.0 means that the thing was sensed in the immediately adjacent grid location.

D. Movement

Robot modules are able to move only in the four directions: east, north, west and south. A robot module can not move by itself; it can only move by sliding against an adjacent robot module.

To slide, a robot module can push itself along another robot module that is adjacent to it at 90 degrees from the direction of motion.

Similarly, a robot module can pull against another robot module that is diagonally adjacent to it in the direction of motion. The pulling style of move is demonstrated in FIG. 2 by considering step 2 as the initial configuration, and considering step 1 as the result of the move.

Robot modules can initiate two different types of moves to reconfigure the robot. A "single" move is the movement of a single robot module, and it succeeds if, and only if, that robot module is moving into an empty grid location and there is a module to push or pull against. A "line" move is the movement of an entire line of robot modules, and it succeeds if, and only if, the front-most module in the line is moving into an empty grid location. A line move can be initiated by any robot module in a line of robot modules.

III. Example Tasks

Six tasks were solved using the present method to construct respective module controller software.

Figure 3:
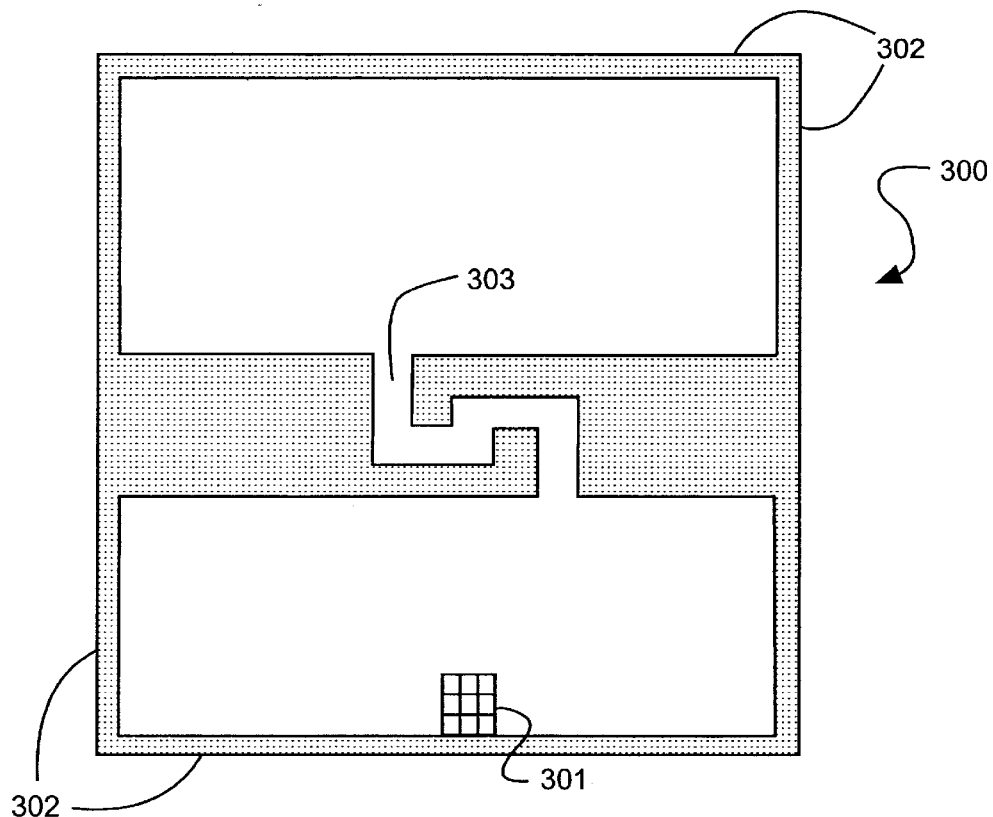
FIG. 3 illustrates the switch-back world for a self-reconfigurable robot at the bottom, according to an embodiment of the present invention.

For each task, we use a 9-module robot 301 arranged in a 3×3 square at the beginning of each fitness evaluation, as illustrated by FIG. 3. A robot is simulated in a square world 40 units on a side. A solid wall 302 of impenetrable obstacles surrounds the entire world.

A. Passage Task

Robot 401 must find a narrow, winding passage 403 that divides a world 400 and travel through this passage 403 as quickly as possible. Robot 401 is initially located at the bottom center of world 400. The order in which the modules in robot 401 are placed and the initial facing direction for each module are determined randomly at the beginning of the run, and held constant for all fitness evaluations.

B. Switchback Task

Robot 301 must find the narrow switchback passage 303 that divides world 300, and navigate through passage 303 as quickly as possible, as illustrated in FIG. 3. Solving this task requires avoiding getting stuck in the local optimum inside of passage 303. For each fitness evaluation, the modules in robot 401 are placed in numerical order and the initial facing directions are set randomly.

C. Passage-and-Carry-Broken-Module Task

Figure 4:
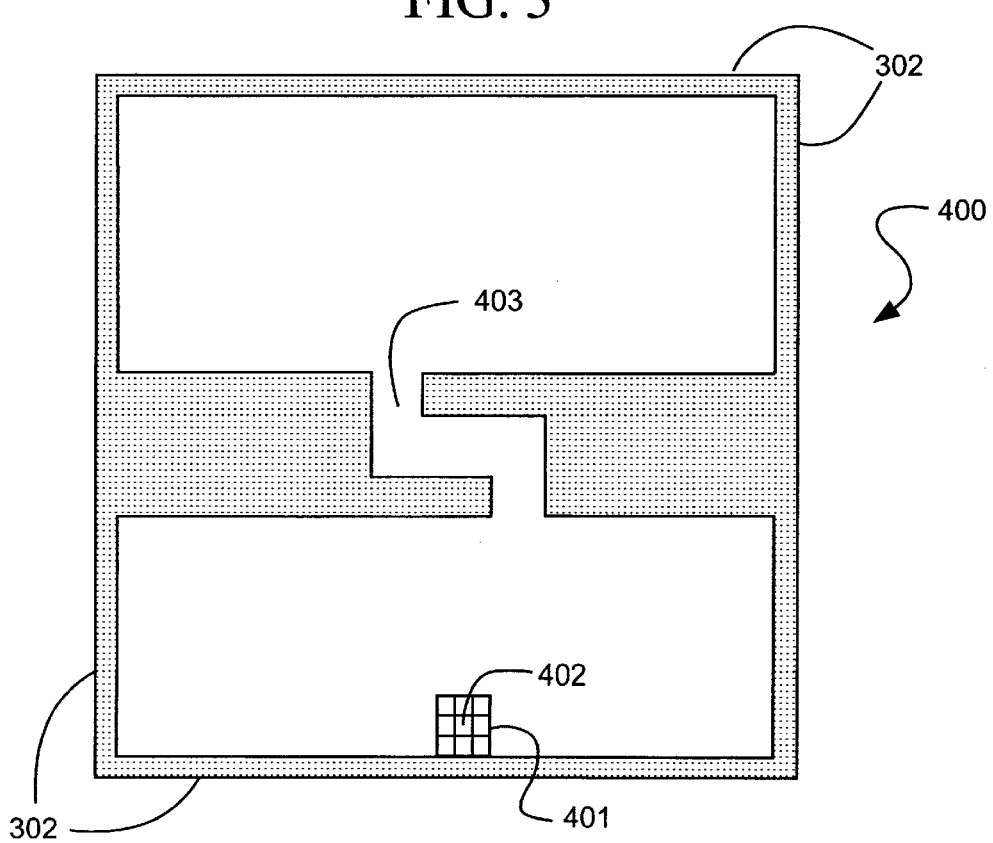
FIG. 4 illustrates a passage-and-eject-broken-model world and a passage-and-carry-broken-module world, having the initial location of the self-reconfigurable robot at the bottom of the world, according to an embodiment of the present invention.

Robot 401 begins with one broken or failed module 402 in its configuration. Robot 401 must carry broken module 402 as it accomplishes the task of finding and passing through a narrow passage 403 as quickly as possible, as illustrated in FIG. 4. The modules have a sensor to detect broken modules. Broken module 402 cannot move or send or receive messages. The initial placement of the modules in robot 401 is the same as in the switchback task.

D. Passage-and-Eject-Broken-Module Task

Robot 401 begins with one broken or failed module 402 in its configuration. Robot 401 must eject module 402 out of the configuration as soon as possible, and then find and pass through a narrow passage 403 as quickly as possible, as illustrated in FIG. 4. The modules have a sensor to detect broken modules. The broken modules cannot move or send or receive messages. The initial placement of the modules in robot 401 is the same as in the switchback task.

E. Bridge Task

Figure 5:
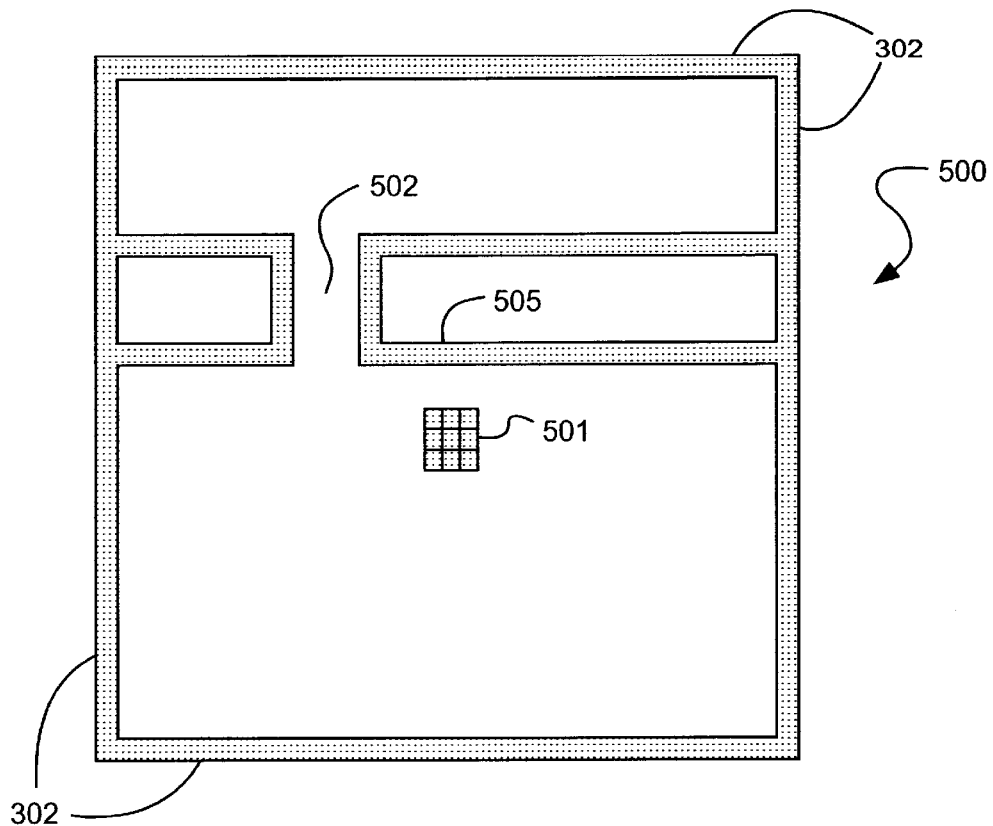
FIG. 5 illustrates a bridge world showing a narrow passage, according to an embodiment of the present invention.

Modules inside a rectangular area 502 cannot initiate moves so they must be moved by other modules outside the rectangular area 502. Rectangular area 502 is seven rows high and two columns wide and can be thought of as a gap in the terrain that robot 501 can only get across by building a bridge out of its modules, and pushing or pulling those modules from either side of the gap. Robot 501 must find rectangular area 502 and get across it to the top of world 500, as illustrated in FIG. 5. Robot 501 is initially located at the center of world 500 configured in a 3×3 square. For each fitness evaluation, the modules in robot 501 are placed in numerical order and initially face east.

F. Move-to-Goal Task

Figure 6:
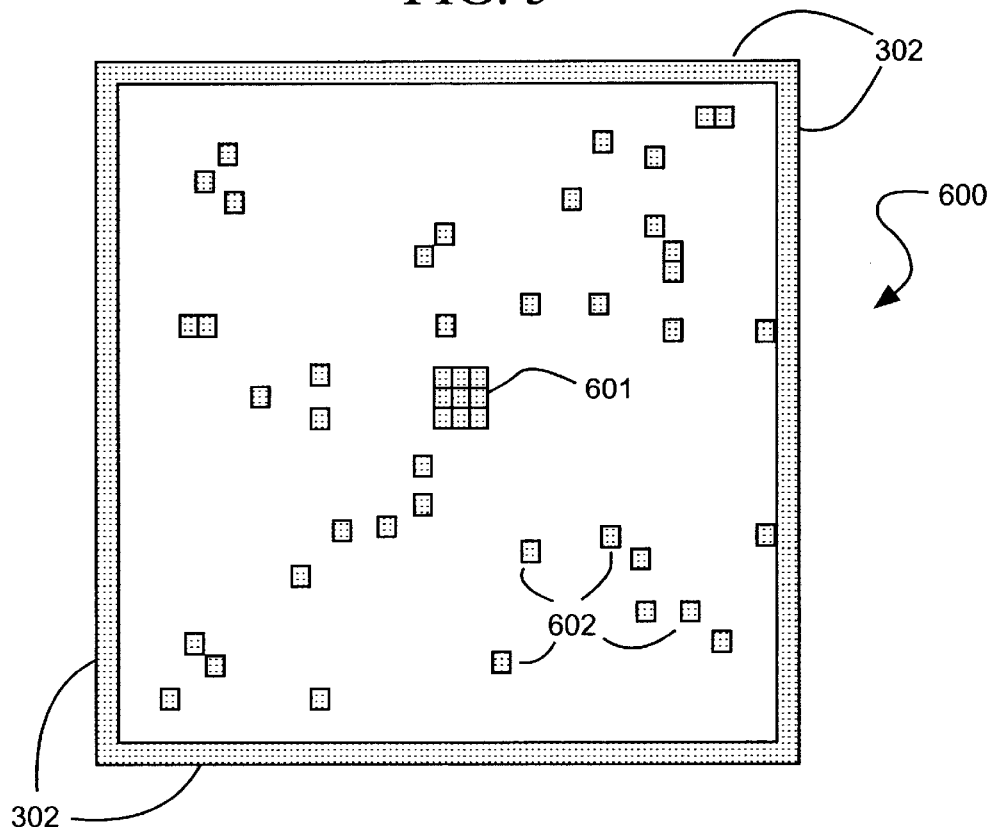
FIG. 6 illustrates a move-to-goal world with randomly placed obstacles, according to an embodiment of the present invention.

Robot 601 must move from the center of each of 36 worlds, around randomly placed obstacles 602, to a goal which is placed at a different location in each world. FIG. 6 shows one of the 36 worlds used for this task. Robot modules 601 can detect the goal direction. The modules are initially configured in a 3×3 square at the center of world 600. In each of the worlds, the modules are placed in numerical order and initially face east.

IV. Function Set

The following primitive function set is used in all six tasks:

BASIC_FUNCTION_SET={MoveSingle,
MoveLine, Rotate, ReadMessage,
SendMessage, ReadSensorSelf,
ReadSensorWall, GetMemory, SetMemory,
And, If, Less, Divide, Modulus}

Two of the tasks use one additional function. The passage-and-eject-broken-module task and the passage-and-carry-broken-module task add to the basic function set a function called readSensorSelfBroken.

Each of these functions are explained below except for the common functions And, Divide, If, Less, and Modulus, which are known to one of ordinary skill in the art.

A. (GetMemory Index) Function (GetMemory index) function gets the current value of the robot module's memory numbered index. This function returns the value of the memory.

B. (MoveLine Direction) Function (MoveLine direction) function causes an entire line of robot modules to move in the relative direction direction, if they can. The line of modules to move is the connected line of modules collinear with the current module in the relative direction of the current module. The line of modules can move if, and only if, the front-most module in the line is not blocked by an immovable wall or obstacle and there is another module adjacent to the line that it can push or pull against. This function returns true if the line of modules is able to move, and false otherwise.

C. (MoveSingle Direction) Function (MoveSingle direction) function causes the current robot module to move in the relative direction if it can move. The module can move if, and only if, it is not blocked by any other object, and there is another robot module adjacent to it that it can push or pull against. This function returns true if the line of modules is able to move, and false otherwise.

D. (ReadMessage Direction) Function (ReadMessage direction) function reads the real-valued message from the adjacent module (if any) that is location at the relative direction direction to the receiving module. The direction is interpreted mod 1, and then rounded to the nearest eighth to indicate one of the eight adjacent grid locations. This function returns the value of the message read.

E. (ReadSensorSelf Direction) Function (ReadSensorSelf direction) function reads the intensity value of the self sensor. Intensity is the inverse of the distance to the closest robot module at the relative direction direction. The intensity is 0 if there is no robot module in that direction, and the intensity is 1 if there is a module in the adjacent square. This function returns the intensity value.

F. (ReadSensorSelfBroken Direction) Function (ReadSensorSelfBroken direction) function reads the intensity value of the SelfBroken sensor. Intensity is the inverse of the distance to the closest broken robot module at the relative direction. The intensity is 0 if there is no broken robot module in that direction, and the intensity is 1 if there is a broken robot module in the adjacent square. This function returns the intensity value.

G. (ReadSensorWall Direction) Function (ReadSensorWall direction) function reads the intensity value of the wall sensor. Intensity is the inverse of the distance to the wall or obstacle in the relative direction direction. The intensity is 0 if there is no wall or obstacle in that direction, and the intensity is 1 if there is a wall block in the adjacent square. This function returns the intensity value.

H. (Rotate Direction) Function (Rotate direction) function rotates the robot module by the amount direction. This does not physically move the module, it just resets the internal state of the robot module's internal facing direction. This function returns the value of direction.

I. (SendMessage Message Direction) Function (SendMessage message direction) function sends the real-valued message message from the sending module to an adjacent module (if any) in the direction direction, relative to the frame of reference of the sending module. The direction is interpreted mod 1, and then rounded to the nearest eighth to indicate one of the eight adjacent grid locations. This function returns the value of the message sent.

J. (SetMemory Index Value) Function (SetMemory index value) function sets the value of the robot module's memory numbered index to value. This function returns value.

K. (BlockMove Direction XPos XNeg YPos YNeg) Function

The(MoveBlock direction xpos xneg ypos yneg)function causes an entire block of robot modules to move in the relative direction, if they can. The block of modules to move is the connected rectangle of modules surrounding the current module. The connected rectangle is specified by xpos, xneg, ypos, and yneg where the rectangle extends xpos modules in the direction direction, xneg modules in the opposite direction, ypos modules in the direction 90 degrees to the left of direction, and yneg modules in the direction 90 degrees to the right of direction. The block of modules can move if, and only if, the front-most modules in the block are not blocked by an immovable wall or obstacle and there is another module adjacent to the block that it can push or pull against. The function returns true if the block of modules is able to move, and false otherwise.

V. Terminal Set

The following terminal set is used by all the tasks.

BASIC_TERMINAL_SET={GetTurn, 0.0, 0.25, 0.5, 0.75, 1.0, -1.0}

The terminal set for the move-to-goal task has three additional terminals:

MOVE_TO_GOAL_TERMINAL_SET=BASIC_TERMINAL_SET+{GoalDirection, GoalX, GoalY}

An explanation for each of the terminals follows:

A. (GetTurn) Function (GetTurn) function returns the current value of the turn variable for the simulation. The turn variable is set to 0 at the beginning of the simulation and is incremented each time all of the robot's modules are executed.

B. Six Constant-Valued Terminals

Six constant-valued terminals 0.0, 0.25, 0.5, 0.75, 1.0, and B1.0 are given. Program trees can use arithmetic to create other numerical values.

C. (GoalDirection) Function (GoalDirection) function returns the direction number corresponding to the direction from the current robot module to the goal in the module's frame of reference.

D. (GoalX) Function (GoalX) function returns the x distance from the current module to the goal in the module's frame of reference.

E. (GoalY) Function (GoalY) function returns the y distance from the current module to the goal in the module's frame of reference.

VI. Fitness Function

The fitness function for each of the six tasks is computed by running a simulation of the robot's actions in respective worlds. The simulation is run for a predetermined number of turns. In each turn, the evolved program tree is executed one time for each module, as shown in this simplified code fragment: A more powerful approach is possible, such as using coroutines.

for (turn=0; turn<maxTurns; turn++) for (module=0; module<maxModules; module++) programTree.eval (module);

While executing the program tree for a single module, the sensor readings, the functions that access the internal state of the modules, and the movement functions are all executed for that one module. At the beginning of each fitness evaluation, the values of the communication receive buffers and the values in all the robot's memory locations are initialized to 0.

A. Passage Task

For the passage task, a fitness function is the sum of penalties computed after each module is executed in each turn of the simulation. The penalty is the sum of the distances of all the robot modules to the top of the exit row of passage 403. This fitness function penalizes the distances of all the modules at each point in the simulation, so it rewards robot 401 for solving the task quickly.

B. Switchback Task

The fitness function is computed in the same way as in the passage task.

C. Passage-and-Carry-Broken-Module Task

The fitness function is computed in the same way as in the passage task. One of the modules is broken so it cannot initiate a move or communicate with other modules. Solving this task requires robot 401 to carry broken module 402 through the passage.

D. Passage-and-Eject-Broken-Module Task

The fitness function has the same penalties for the working modules as passage task. The contribution to fitness for the broken module 402 is the distance between broken module 402 and the bottom of the world. This penalty is added to the fitness function after each module is simulated, so the robot is rewarded for ejecting the broken module quickly.

E. Bridge Task

The fitness function is computed at the end of the simulation. The fitness is the sum of the distances between each module and the top of the world. The robot must configure itself into a bridge in order to cross the gap.

F. Move-to-Goal Task

The fitness function is computed at the end of the simulation, and combines two penalties. The first penalty rewards robot 601 for getting close to the goal by taking the average percentage distance remaining between each robot's starting location and the goal. The second penalty penalizes robot 601 for getting disconnected by taking the percentage of modules that are disconnected from the closest connected group of modules to the goal. The fitness function is the first penalty plus twice the second penalty.

VII. Parameters

The parameter values for all six tasks are the same except for population size. Population sizes for each task are described in the results section. The crossover and mutation rates are 99%, and 1% respectively. Crossover selects nodes uniformly from all the nodes in a tree. A generational breeding model is used with tournament selection, and a tournament size of 7. Elitism is used, which insures that the most fit individual in each generation is cloned into the next generation. The method for creating program trees in generation 0 and in mutation operations is the "full" method as described in Koza 1992. The maximum depth for program trees in generation 0 is 6. The maximum depth for program trees created by crossover and mutation is 10. The maximum depth of subtrees created by mutation is 4. Strongly typed genetic programming is used as described in Haynes, Thomas, Wainwright, Roger, Sen, Sandip, Schoenfeld, Dale, "Strongly Typed genetic Programming in Evolving Cooperation Strategies", in Proceedings of the Sixth International Conference on Genetic Algorithms, San Francisco, Calif.: Morgan Kaufmann. 271–278.

VIII. Parallelization

The population is divided into semi-isolated subpopulations called demes, as described by Wright, Sewell. 1943. Isolation by Distance. Genetics 28:114–138. Breeding is panmictic within each deme, and rare between demes. A parallelization scheme is the distributed asynchronous island approach, as described in John R. Koza, Forrest H. Bennett III, David Andre, Martin A. Keane, *Genetic Programming III: Darwinian Invention and Task Solving,* Morgan Kaufmann: San Francisco, Calif. 1999. The communication topology between the demes is a toroidal grid with periodic boundary conditions. Each processor communicates only with its four nearest neighbors. At the end of each generation, 2% of the population is selected at random to migrate in each of the four cardinal directions.

IX. Flowchart

Figure 10:
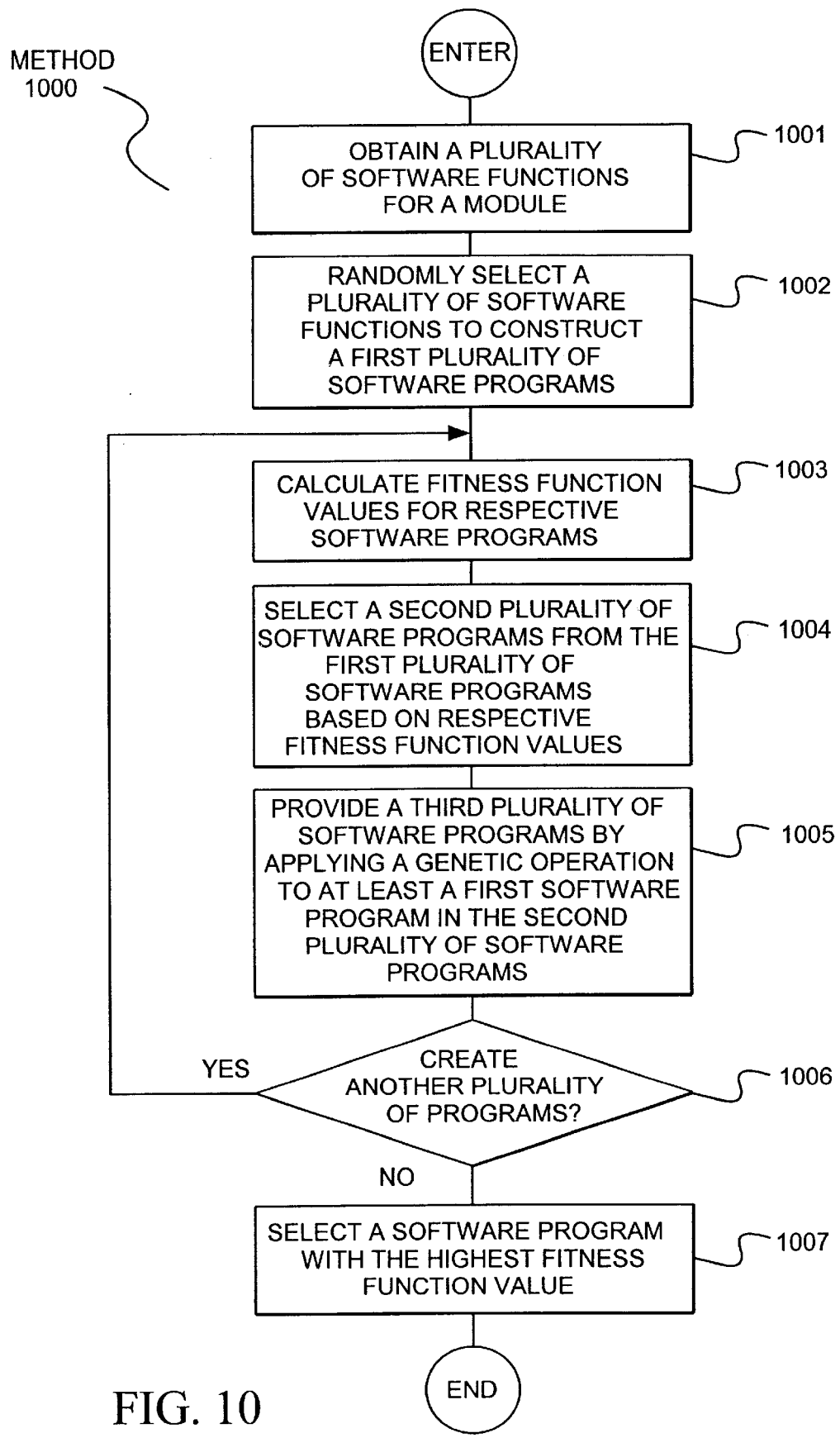
FIG. 10 illustrates a flow chart for constructing a software program for a module in a self-reconfigurable robot, according to an embodiment of the present invention.

As one who is skilled in the art would appreciate, FIG. 10 illustrates logic blocks for performing specific functions of an embodiment of the present invention. In alternate embodiments, more or fewer logic blocks may be used. In an embodiment of the present invention, logic blocks may represent software programs, software objects, software functions, software subroutines, code fragments, hardware operations, user operations, singly or in combination.

FIG. 10 is a flowchart of method 1000 for constructing a software program for a module in a self-reconfigurable robot according to an embodiment of the present invention. A plurality of software functions are obtained as illustrated by logic block 1001. In an embodiment, the plurality of software functions for a module are described above.

A plurality of software functions are randomly selected to provide a first plurality of software programs for solving a task as illustrated in logic block 1002. In an embodiment of the present invention, the task is one of the tasks, singly or in combination, described above. In an embodiment, duplicate functions may be selected to form a software program in the first plurality of software programs.

A fitness function is used to evaluate the first plurality of software programs by calculating respective fitness function values as illustrated in logic block 1003. In an embodiment, a fitness function is provided by a user. In an embodiment of the present invention, a fitness function, singly or in combination, as described above, is used.

A second plurality of software programs is selected from the first plurality of software programs based on the first plurality of software programs respective fitness function values, as illustrated by logic block 1004. In an embodiment, the second plurality of software programs includes duplicate software programs of the first plurality of software programs.

The second plurality of software programs are modified by genetic operations, such as crossover, mutation and cloning, singly or in combination, as illustrated by logic block 1005.

A decision is made whether another plurality of programs are constructed, or a new generation or population is formed, as illustrated by logic block 1006.

If a new generation of software programs is desired, control transitions to logic block 1003 where functions described in logic blocks 1003 through 1005 are repeated. Otherwise, logic transitions to logic block 1007 where the software program for a module which has the highest fitness function is selected.

In an embodiment of the present invention, method 1000 is performed, at least partially, by a computer software program stored on an, article of manufacture, computer-readable medium such as a magnetic hard disk, floppy disk, CD-ROM, or other writeable data storage technologies, singly or in combination.

X. Results on Example Tasks

A. Switchback Task

This task was run with 20 demes and 2,500 individuals per deme, for a total population of 50,000. This task solved on its one and only run.

The best program evolved for this task has a fitness of 12,770 and appeared in generation 156 of the run. This program has 73 instructions:

(If (MoveLine (Rotate (Divide (SetMemory (GetMemory 0.75) (Rotate (GetMemory GetTurn))) (SetMemory (SetMemory −1.0 GetTurn) (Rotate (GetMemory GetTurn)))))) 0.5 (If (MoveLine (Rotate (Divide (SetMemory (GetMemory GetTurn) (Rotate (GetMemory GetTurn))) (SetMemory (SetMemory −1.0 GetTurn) (Rotate (GetMemory GetTurn)))))) (GetMemory (SetMemory (Rotate (Divide 0.0 0.75)) (Rotate (GetMemory GetTurn)))) (If (MoveLine (Divide (GetMemory GetTurn) (SetMemory (Rotate (Divide 0.0 0.75)) (Rotate (GetMemory GetTurn))))) (Divide 0.5 0.0) (If (MoveLine 0.25) (SetMemory (Divide 0.5 0.0) (Rotate (Divide 0.0 0.75))) (Rotate 0.25)))))

The qualitative behavior of this evolved software controller program is as follows: The modules quickly aligned their facing directions to all face East as they used MoveLine to head towards the passage. They moved efficiently toward the passage opening and down the first leg of the passage. The remaining motion was still fairly efficient, with just occasional backtracking. Robot 301 stayed in one piece until it began to go round the third bend, at which point it split into two pieces, the one in front containing three modules, the one in back 6. A few moves later, two of the modules in back broke off from the group of six and joined up with the front group of three just as they exited passage 303. The remaining four modules exited the passage together.

The modules faced East down the first leg of the passage, and north while moving along the first jog, in both cases facing 90 degrees away from the primary direction of motion. Similarly, along the third leg, the modules faced West. For the final two legs, the facing directions among the different modules were not consistent.

B. Passage-and-Carry-Broken-Module Task

This task was run with 6 demes and 2,500 individuals per deme, for a total population of 15,000. This task solved on its one and only run.

The best program evolved for this task has a fitness of 7786 and appeared in generation 476 of the run. This program has 65 instructions:

(SetMemory (ReadSensorSelfBroken (Rotate (Divide (Divide 1.0 0.75) (GetMemory (ReadSensorSelf (ReadSensorSelf 1.0)))))) (If (MoveLine (SendMessage (SendMessage GetTurn 0.25) 0.25)) (Rotate (Modulus (ReadSensorSelfBroken 0.75) 0.0)) (If (And (And (LT 0.0 0.25) (MoveLine 0.0)) (And (MoveLine (SendMessage GetTurn 0.25)) (And (MoveLine (Divide (Divide 1.0 0.75) (GetMemory 0.25))) (MoveLine 0.25)))) (If (MoveLine 0.25) (Rotate (Modulus 0.75 0.0)) (ReadSensorSelf 1.0)) (Modulus (If (MoveLine 0.5) (ReadSensorWall 0.25) (SendMessage 0.25 GetTurn)) 0.75))))

The modules of robot 401 align to face East while moving straight North. Once they hit the wall, they move East towards the passage 403 opening, still remaining in a 3×3 formation. Once they reach the passage 403 opening, one module moves to the left of the opening while the others go inside passage 403. The module to the left of the opening later pushes the broken module 402 into the passage. These two modules plus a third became disconnected from the rest of the robot before entering the passage, but join up with the others within the first leg. Along the second leg, the broken module 402 is first pulled away from the corner by a module in front using a MoveLine function, then three modules line up behind to help push it along. The broken module 402 is again pulled by a module into the final leg and then pushed by modules behind it.

C. Passage-and-Eject-Broken-Module Task

This task was run with 4 demes and 2,500 individuals per deme, for a total population of 10,000. This task solved on its one and only run.

The best program evolved for this task has a fitness of 17,343 and appeared in generation 29 of the run. This program has 63 instructions:

(If (MoveLine (Rotate (Modulus (ReadMessage (Rotate (Modulus 0.75 0.0))) (If (MoveSingle (Divide 0.75 −1.0))) (ReadSensorSelfBroken (Modulus −1.0 0.5)) (GetMemory (SetMemory GetTurn 0.25)))))) (ReadSensorWall (SetMemory 0.0 0.0)) (If (MoveLine (Modulus 1.0 (Modulus (Modulus 0.75 0.0) (If (LT (Rotate 0.25) 0.0) 0.5 (ReadMessage (SetMemory 0.0 0.0))))))) (SetMemory GetTurn 0.25) (ReadMessage (SetMemory (If (MoveLine (Modulus 1.0 0.75 )) −1.0 (Modulus −1.0 (Rotate (Modulus 0.0 (ReadMessage GetTurn))))) 0.0))))

Robot 401 initially moves East in a 3×3 formation until it is in line with the passage opening. Most of the modules head straight to the passage opening, but the three Southwest modules break off from the rest. The southmost module pushes the broken module forward twice before going around it to the left, and another module pulls it forward once, so the end state is not completely optimal. All of the modules face North once they have left the broken module 402 behind. The robot is in three pieces as it enters the passage. Within passage 403, the groups reconnect, but separate again into two groups before leaving passage 403.

D. Bridge Task

This task was run with 4 demes and 4,000 individuals per deme, for a total population of 16,000. This task solved on its one and only run.

The best program evolved for this task has a fitness of 9 and appeared in generation 60 of the run. This program has 49 instructions:

(If (And (And (MoveLine 0.25) (MoveLine (If (And (MoveLine 0.25) (MoveSingle 0.5)) (GetMemory (SetMemory 0.25 1.0)) (GetMemory (SetMemory 0.25 1.0))))) (And (MoveLine 0.25) (MoveLine 0.5))) (SetMemory (If (And (MoveLine 0.25) (MoveSingle 0.5)) (SetMemory (SetMemory (Modulus GetTurn 0.25) 0.0) (Rotate −1.0)) (GetMemory (SetMemory 0.75 1.0))) (ReadSensorWall 0.25)) (Modulus GetTurn 0.25))

Robot 501 remains in a 3×3 formation as it heads straight North to wall 505 and then West to the gap 502 opening. The front row enters the gap 052 one by one, as other modules move forward to the wall. The modules cross the gap 502 in single file. Once on the other side, the frontmost module moves left so that it can pull the others across. Robot 501 stays in on piece until it has crossed gap 502 (that is the only way it can solve the task). Robot 501 then breaks into two pieces before forming a single line against the North wall. The modules face East throughout.

E. Move-to-Goal Task

This task was run with 1 deme of 2,000 individuals. The task was run 20 times, and we report here on the best solution found of those 20 runs.

The best program evolved for this task has a fitness of 0.1248 and appeared in generation 20 of the run. This program has 16 instructions:

(If (MoveLine GoalDirection) GoalLocationX (If (MoveLine (If (MoveSingle (Rotate 0.25)) GoalDirection GoalLocationX)) (Rotate 0.25) (ReadSensorSelf 0.25)))

This program first tries to move the current module in the goal direction. If that succeeds, the program is done. Otherwise, the program rotates the module 90 degrees to the left and attempts a MoveOne function. If the MoveOne function succeeds, the module then also attempts a MoveLine function in the goal direction. If the MoveOne function fails, the module attempts a MoveLine function in the direction of the X displacement to the goal. If the MoveLine function succeeds, the module then rotates 90 degrees to the left.

XI. Comparisons

Six sets of comparative runs for the passage task were performed to determine the effects of changing various run parameters. All runs used a population of 3000. The base case for all comparisons consisted of 40 runs of the passage task as described above.

Figure 7:
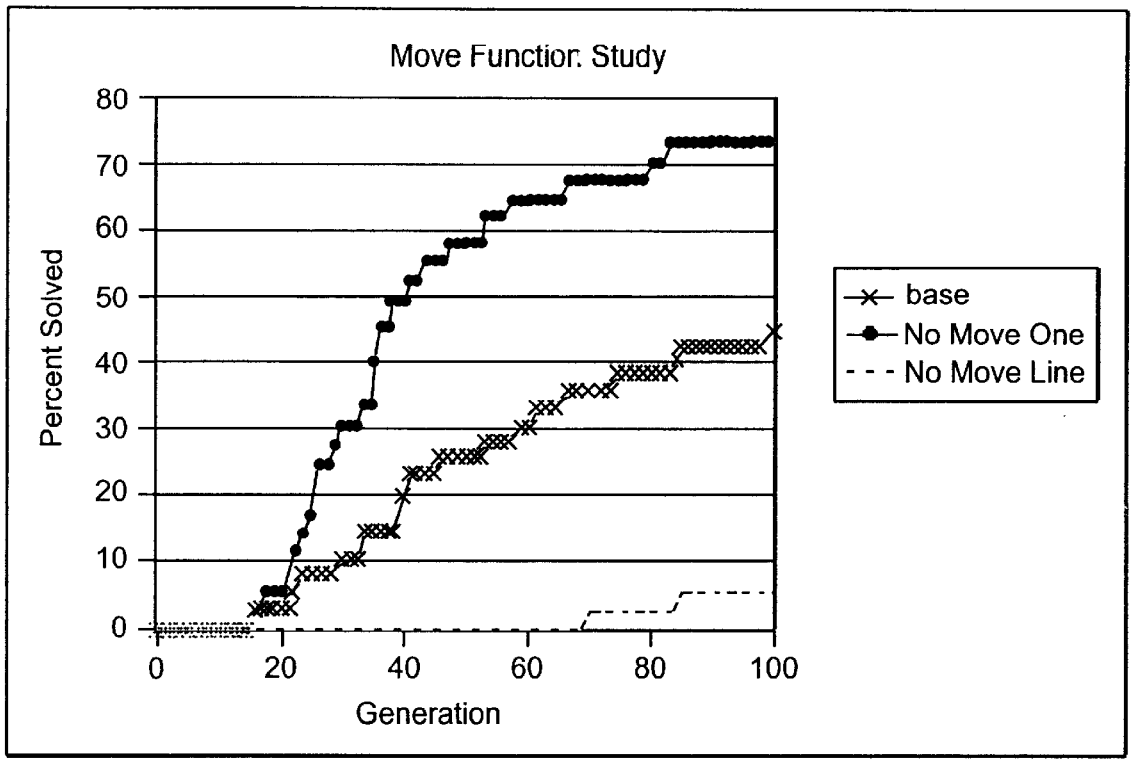
FIG. 7 illustrates the percentage of runs solved by generation for the base case runs, the runs without a MoveOne function in the function set and the runs without a MoveLine function, according to an embodiment of the present invention.

The first study involved 37 runs of the passage task with the MoveOne function removed from the function set. The second study involved 40 runs of the passage task with the MoveLine function removed. As can be seen in FIG. 7, by generation 100, 45% of the base case runs had solved, 73% of the runs without the MoveOne function had solved, and only 5% of the runs without the MoveLine function had solved. The Moveone function represents the raw basic moving capability of a module, whereas the MoveLine function is a higher level movement abstraction. The results illustrate the advantage of including higher level movement functions.

Figure 8:
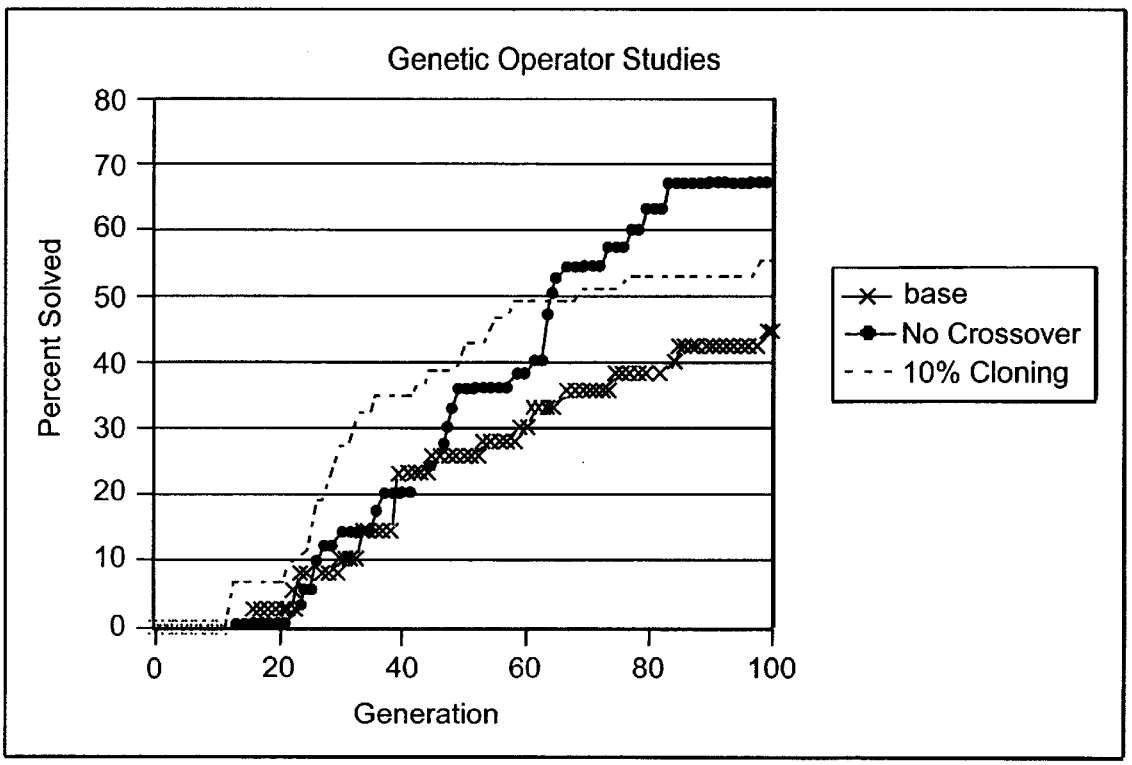
FIG. 8 illustrates the percentage of runs solved by generation for the base case runs, the runs with crossover disabled, and the runs with cloning enabled, according to an embodiment of the present invention.

The third study involved 40 runs of the passage task using 100% mutation and no crossover, while the fourth study used 90% crossover and 10% cloning in 47 runs. As can be seen in FIG. 8, by generation 100, 67.5% of the runs without crossover had solved, 55.3% of the runs with 10% cloning had solved, compared to only 45% of the base cases.

Figure 9:
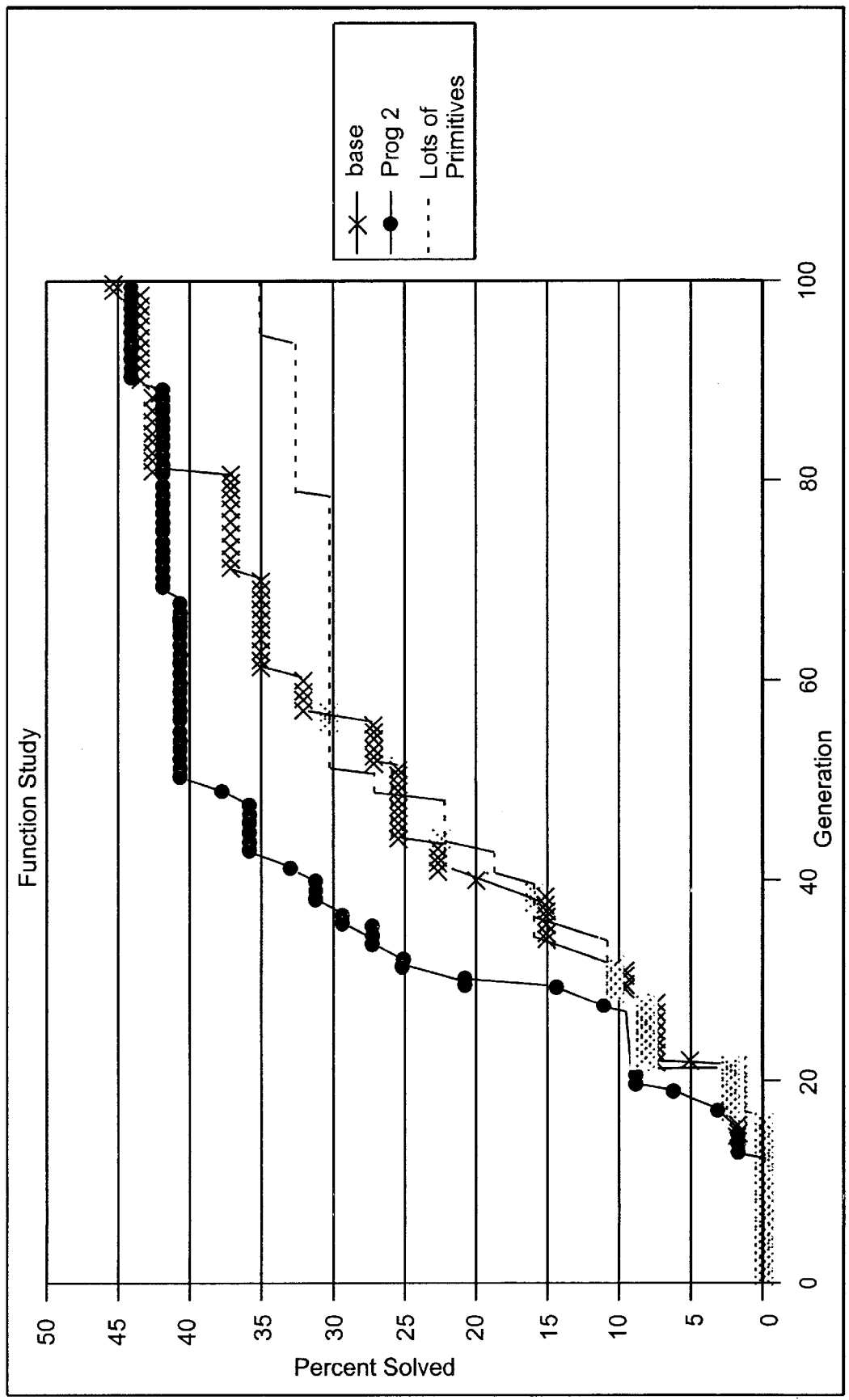
FIG. 9 illustrates the percentage of runs solved by generation for the base case runs, the runs for Prog2 added, and the runs for six additional functions, according to an embodiment of the present invention.

The fifth study involved 48 runs of the passage task with the Prog2 function added to the function set. The Prog2 function is a function which has two arguments. The first argument is evaluated and then the second argument is evaluated. The sixth study involved 37 runs of the passage task with the following six functions added to the function set: Add, Sub, Mult, GreaterThanOrEqual, Or, and Not. As can be seen in FIG. 9, the addition of the Prog2 function was some advantage in the middle generations, but by generation 100 there was little difference compared to the base case. The runs with the additional six functions kept pace with the base case up through generation 60, but then fell behind.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents:

What is claimed is:

1. A method for providing software for a module in a self-reconfigurable robot, comprising the steps of:
    (a) providing a plurality of software functions for performing a respective plurality of module functions;
    (b) constructing a first plurality of software programs for solving a task from the plurality of software functions;
    (c) executing the first plurality of software programs to obtain a plurality of respective results;
    (d) obtaining a task fitness function for providing a fitness value;
    (e) calculating a plurality of respective fitness function values for the first plurality of software programs;
    (f) selecting a second plurality of software programs from the first plurality of software programs based on the respective fitness function values; and,
    (g) constructing a third plurality of software programs from the second plurality of programs using a genetic operation.

2. The method of claim 1, wherein the genetic operation is a crossover operation.

3. The method of claim 2, wherein the crossover operation includes obtaining respective parse tree representations of a first and a second ("parent") computer program in the second plurality of software programs to create a first and second ("child") software program by exchanging a randomly selected subtree between the first and second parent computer programs.

4. The method of claim 2, wherein the crossover operation includes obtaining respective parse tree representations of a first and a second ("parent") computer program in the second plurality of software programs to create only a first ("child") software program by exchanging a randomly selected subtree between the first and second parent computer programs.

5. The method of claim 4, wherein the mutation operation includes obtaining a parse tree representation of a first software computer program in the second plurality of computer programs, where the parse tree representation includes a first subtree, and randomly selecting the first subtree and replacing the first subtree with a randomly created second subtree.

6. The method of claim 1, wherein the genetic operation is a mutation operation.

7. The method of claim 1, wherein the genetic operation is a cloning operation.

8. The method of claim 7, wherein the cloning operation includes copying a first software program in the second plurality of software programs.

9. The method of claim 1, wherein the plurality of functions includes a (GetMemory index) function.

10. The method of claim 1, wherein the plurality of functions includes a (MoveLine direction) function.

11. The method of claim 1, wherein the plurality of functions includes a (MoveSingle direction) function.

12. The method of claim 1, wherein the plurality of functions includes a (ReadMessage direction) function.

13. The method of claim 1, wherein the plurality of functions includes a (ReadSensorSelf direction) function.

14. The method of claim 1, wherein the plurality of functions includes a (ReadSensorSelfBroken direction) function.

15. The method of claim 1, wherein the plurality of functions includes a (ReadSensorWall direction) function.

16. The method of claim 1, wherein the plurality of functions includes a (Rotate direction) function.

17. The method of claim 1, wherein the plurality of functions includes a (SendMessage message direction) function.

18. The method of claim 1, wherein the plurality of functions includes a (SetMemory index number) function.

19. The method of claim 1, wherein the plurality of functions includes a (BlockMove direction xpos xneg ypos yneg) function.

20. The method of claim 1, wherein the plurality of functions includes a (And) function.

21. The method of claim 1, wherein the plurality of functions includes a (If) function.

22. The method of claim 1, wherein the plurality of functions includes a (Less) function.

23. The method of claim 1, wherein the plurality of functions includes a (Divide) function.

24. The method of claim 1, wherein the plurality of functions includes a (Modulus) function.

25. The method of claim 1, wherein the plurality of tasks includes a reconfiguration task.

26. The method of claim 1, wherein the module is a sliding module.

27. The method of claim 1, wherein the module is a rotating module.

28. The method of claim 1, wherein the module is a compressable module.

29. The method of claim 1, wherein the task is moving a self-reconfigurable robot through a narrow passage.

30. The method of claim 1, wherein the task is moving the self-reconfigurable robot through a switchback passage.

31. The method of claim 1 wherein the task is moving the self-reconfigurable robot having a broken module through a switchback passage.

32. The method of claim 1, wherein the task is 1) moving the self-reconfigurable robot through a switchback passage, and 2) ejecting a broken module.

33. The method of claim 1, wherein the task is forming a bridge over a gap.

34. The method of claim 1, wherein the task is moving the self-reconfigurable robot toward a goal.

35. The method of claim 1, wherein the task is moving the self-reconfigurable robot toward a goal in the presence of obstacles.

36. The method of claim 1, wherein the module includes a sensor, a motor, and a power source.

37. The method of claim 1, wherein the fitness function includes measuring the distance between a robot location and a selected location.

38. The method of claim 1, wherein the fitness function includes the amount of time to solve the task.

39. The method of claim 1, wherein the fitness function includes the amount of power used to solve the task.

40. The method of claim 1, wherein the robot includes a plurality of modules and where the fitness function includes a number of modules connected.

41. The method of claim 1, wherein the fitness function includes the size of a selected software program in the second plurality of software programs.

42. An article of manufacture, including a computer-readable memory, comprising:
(a) a first plurality of software functions for performing a respective plurality of module functions in a self-reconfigurable robot;
(b) a first software program for randomly selecting a plurality of software functions for forming a first plurality of software programs;
(c) a fitness function for obtaining a respective plurality of fitness function values for the respective first plurality of software programs; and,
(d) a second software program for constructing a second plurality of software programs from the first plurality of software programs based on the plurality of respective fitness function values.

43. The article of manufacture of claim 42, further comprising:
(e) a third software program for forming a third plurality of software programs from the second plurality of software programs by using a genetic operation on a software program in the second plurality of software programs.

44. A self-reconfigurable robot, comprising:
(a) a first module; and,
(b) a second module having a memory, coupled to a processor, for storing a software program for solving a task, wherein the software program is constructed from genetic programming and is able to complete the task with a failure of the first module.

45. The self-reconfigurable robot of claim 44, wherein the first module is a sliding module.

46. The self-reconfigurable robot of claim 44, wherein the first module is a rotating module.

47. The self-reconfigurable robot of claim 44, wherein the first module is a compressable module.

48. A self-reconfigurable robot, comprising:
(a) first module; and,
(b) a second module having a memory, coupled to a processor, for storing a software program for solving a task, wherein the software program is constructed from genetic programming and the first and second modules are able to complete the task with the addition of a plurality of modules storing the software program, respectively.

* * * * *